United States Patent
Sugiura et al.

(10) Patent No.: US 7,497,610 B2
(45) Date of Patent: Mar. 3, 2009

(54) LIGHT GUIDING PLATE INCLUDING A PLURALITY OF PRISMS, SURFACE EMITTING DEVICE USING LIGHT GUIDING PLATE, AND LIQUID CRYSTAL DISPLAY DEVICE USING LIGHT GUIDING PLATE

(75) Inventors: Takuro Sugiura, Fukushima-ken (JP); Koichi Yamamoto, Fukushima-ken (JP); Hideaki Nagakubo, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/269,194

(22) Filed: Oct. 25, 2005

(65) Prior Publication Data

US 2006/0092668 A1     May 4, 2006

(30) Foreign Application Priority Data

Oct. 28, 2004    (JP)   ............................ 2004-314517
Apr. 22, 2005    (JP)   ............................ 2005-125475

(51) Int. Cl.
     *G02B 6/10*      (2006.01)
(52) U.S. Cl. ........................................ 362/620; 362/606
(58) Field of Classification Search ................ 362/620, 362/626, 615, 623, 600, 606, 617; 349/57, 349/63, 65
See application file for complete search history.

(56) References Cited

U.S. PATENT DOCUMENTS

| | | | | |
|---|---|---|---|---|
| 5,467,208 A | * | 11/1995 | Kokawa et al. | 349/67 |
| 6,104,453 A | | 8/2000 | Watanabe | |
| 6,129,439 A | * | 10/2000 | Hou et al. | 362/626 |
| 6,749,311 B2 | * | 6/2004 | Suzuki et al. | 362/610 |
| 6,969,187 B2 | * | 11/2005 | Niida et al. | 362/603 |
| 7,079,119 B2 | * | 7/2006 | Hanson et al. | 345/175 |
| 7,104,679 B2 | * | 9/2006 | Shin et al. | 362/626 |
| 7,134,778 B2 | * | 11/2006 | Kazuhiro et al. | 362/620 |
| 7,163,332 B2 | * | 1/2007 | Shimizu et al. | 362/619 |
| 7,275,853 B2 | * | 10/2007 | Kano et al. | 362/620 |

FOREIGN PATENT DOCUMENTS

WO     WO 01/88430 A1 * 11/2001

* cited by examiner

*Primary Examiner*—Jong-Suk (James) Lee
*Assistant Examiner*—Leah S Lovell
(74) *Attorney, Agent, or Firm*—Brinks Hofer Gilson & Lione (57) ABSTRACT

A light guiding plate comprises a pair of main surfaces opposite to each other, and an end surface on which light emitted from a light source is incident. One of the pair of main surfaces has a plurality of prisms. Each of the prisms has a first surface which is relatively close to the end surface and has a relatively gentle slope, a second surface which is relatively distant from the end surface and has a relatively steep slope, and a third surface located between the first surface and the second surface, and an angle between the second surface and the third surface is an acute angle.

7 Claims, 5 Drawing Sheets

- EXPERIMENTAL EXAMPLE 1
- × EXPERIMENTAL EXAMPLE 2
- □ EXAMPLE OF THE INVENTION

FIG. 10
PRIOR ART

LIGHT GUIDING PLATE INCLUDING A PLURALITY OF PRISMS, SURFACE EMITTING DEVICE USING LIGHT GUIDING PLATE, AND LIQUID CRYSTAL DISPLAY DEVICE USING LIGHT GUIDING PLATE

BACKGROUND OF THE INVENTION

1. Field of the Invention

The present invention relates to a light guiding plate, a surface emitting device using the light guiding plate, and a liquid crystal display device using the light guiding plate. In particular, the invention relates to a light guiding plate capable of efficiently directing light to a viewer, a surface emitting device using the light guiding plate, and a liquid crystal display device using the light guiding plate.

2. Description of the Related Art

Conventionally, a surface emitting device which illuminates a liquid crystal display panel, for example, a frontlight has been known as an illumination unit of a display device, such as a liquid crystal display device. In general, a conventional frontlight is mainly composed of a light source, and a light guiding plate from which light emitted from the light source exits toward a liquid crystal display panel.

Figure 10:
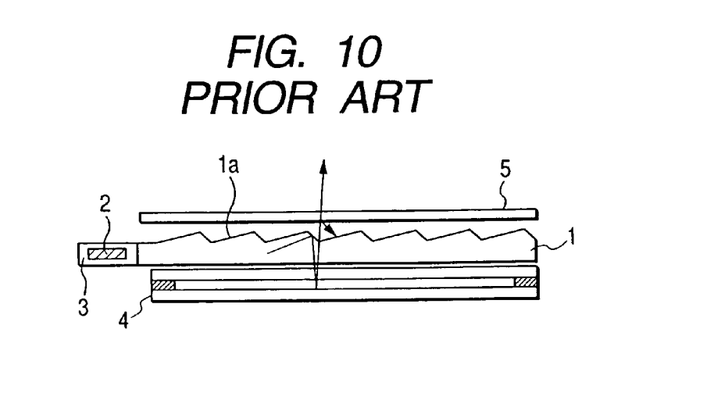
FIG. 10 is a view illustrating the configuration of a liquid crystal display device having a conventional frontlight.

FIG. 10 is a view illustrating the configuration of a liquid crystal display device having a conventional frontlight. The liquid crystal display device shown in FIG. 10 includes a liquid crystal display panel 4, a frontlight disposed on the liquid crystal display device 4, and a cover 5 disposed on a light guiding plate of the frontlight. The frontlight has a light guiding plate 1. The light guiding plate 1 has a flat shape, and has a pair of main surfaces opposite to each other and a pair of end surfaces opposite to each other. One (a main surface close to a viewer) of the pair of main surfaces is provided with a plurality of prisms 1a. A bar-shaped light guide 3 is disposed near one of the pair of end surfaces, and a light source 2 is disposed at one end portion of the bar-shaped light guide 3.

In the frontlight, light emitted from the light source 2 is incident on an end surface of the light guiding plate 1 to propagate through the inside of the light guiding plate 1. The light reflected from the prisms 1a in the light guiding plate 1 is directed to the liquid crystal display panel 4, then is reflected from the liquid crystal display panel 4, and then passes through the light guiding plate 1 and the cover 5 to be directed to a viewing side, as shown by an arrow in the figure.

However, in the light guiding plate 1 shown in FIG. 10, the light is reflected from the prisms 1a to be directed to the liquid crystal display panel 4. As such, if the light is reflected from the prisms 1a having a shape shown in FIG. 10, it is not avoidable that some of the light components leak from a main surface having the prisms 1a. Further, the light reflected from the liquid crystal display panel 4 passes through the light guiding plate 1 and then even passes through the cover 5. At this time, some of the light components having passed through the light guiding plate 1 are reflected from the cover not to be transmitted through the cover 5, as shown by the arrow in FIG. 10. Therefore, with the light guiding plate having the configuration shown in FIG. 10, it is not possible to efficiently direct light to the viewer.

SUMMARY OF THE INVENTION

The invention is designed to solve the above problem, and it is an object of the invention to provide a light guiding plate capable of efficiently directing light to a viewer, a surface emitting device using the light guiding plate, and a liquid crystal display device using the light guiding plate.

In order to achieve the above object, according to an aspect of the invention, a light guiding plate includes a pair of main surfaces opposite to each other; and an end surface on which light emitted from a light source is incident. One of the pair of main surfaces has a plurality of prisms. Each of the prisms has a first surface which is relatively close to the end surface and has a relatively gentle slope, a second surface which is relatively distant from the end surface and has a relatively steep slope, and a third surface located between the first surface and the second surface, and the angle between the second surface and the third surface is an acute angle.

In the light guiding plate of the invention, preferably, the angle between the second surface and the third surface is set such that light incident from the end surface is reflected from the second surface and then the reflected light exits outside from the third surface.

According to the configuration described above, light leaking from the main surface having the prisms can be reduced as much as possible, and as a result, the light can be efficiently directed to a liquid crystal display panel. In addition, since the angle between the second surface and the third surface can be formed to be relatively large, a resin can be easily filled into a mold during an injection molding process. Thereby, a resin is filled up to the apices of prisms in the mold, which makes it possible to obtain a light guiding plate having an intended shape.

Further, in the light guiding plate of the invention, preferably, the length of the third surface is equal to or smaller than a length when the second surface is projected onto the third surface. According to the configuration, it is possible to improve the illumination contrast of a display device under a state in which the image quality is further improved.

Furthermore, in the invention, preferably, the light guiding plate is made of a transparent resin material. In this case, it is preferable that the angle between the second surface and the third surface be determined on the basis of characteristics of the transparent resin material. Moreover, in this case, it is preferable that the characteristics are at least one selected from a group composed of a melt flow rate, a viscosity, and a flow stop temperature.

In addition, according to another aspect of the invention, a surface emitting device includes the light guiding plate; and a light source disposed near the end surface of the light guiding plate.

According to the configuration, the light exiting from the one main surface is directly provided to the liquid crystal display panel, so that the light exiting from the light guiding plate can be directly provided to the liquid crystal display panel without any loss of light. Also, since the one main surface having the prisms faces the liquid crystal display panel, the other main surface of the light guiding plate opposite to the one main surface having the prisms is a flat surface. For this reason, a cover for protecting the prisms of the light guiding plate is not required, and accordingly, optical elements can be easily disposed on the main flat surface of the light guiding plate as occasion demands.

Further, according to another aspect of the invention, a liquid crystal display device includes the surface emitting device; and a liquid crystal display panel disposed to face the one main surface having the prisms of the light guiding plate.

According to the configuration, the light exiting from the one main surface is directly provided to the liquid crystal display panel, so that the light exiting from the light guiding plate can be directly provided to the liquid crystal display panel without any loss of light. Also, since the one main surface having the prisms faces the liquid crystal display panel, the other main surface of the light guiding plate opposite to the one main surface having the prisms is a flat surface. For this reason, a cover for protecting the prisms of the light guiding plate is not required, and accordingly, optical elements can be easily disposed on the main flat surface of the light guiding plate as occasion demands.

Furthermore, according to another aspect of the invention, an electronic paper apparatus includes the surface emitting device; and an electronic paper device disposed to face the one main surface having the prisms of the light guiding plate.

DESCRIPTION OF THE PREFERRED EMBODIMENT

Hereinafter, the preferred embodiments of the invention will be described in detail with reference to the accompanying drawings.

Figure 1:
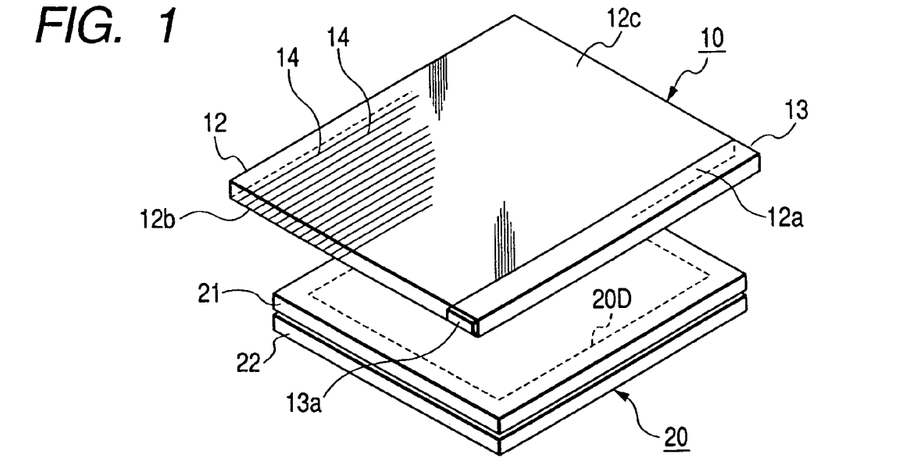
FIG. 1 is a perspective view illustrating the configuration of a liquid crystal display device having a frontlight according to an embodiment of the invention.
Figure 2:
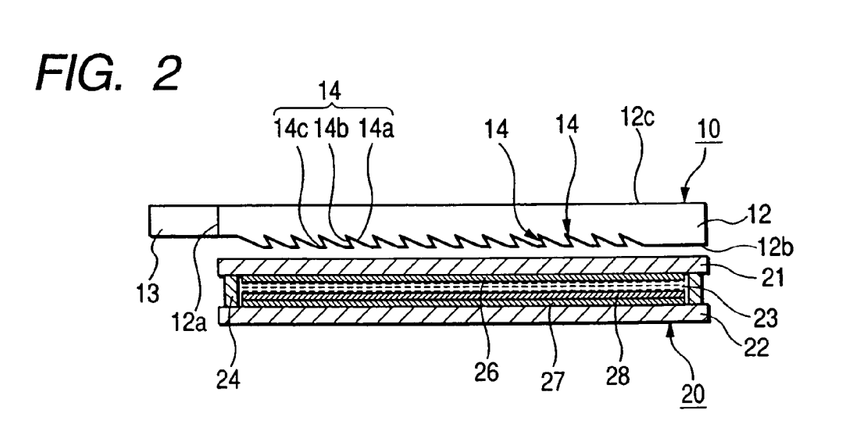
FIG. 2 is a cross-sectional view of the liquid crystal display device shown in FIG. 1.

FIG. 1 is a perspective view illustrating the configuration of a liquid crystal display device having a frontlight according to an embodiment of the invention, and FIG. 2 is a cross-sectional view of the liquid crystal display device shown in FIG. 1. The liquid crystal display device shown in FIG. 1 is mainly composed of a frontlight 10, which is a surface emitting device, and a liquid crystal display panel 20 disposed at a bottom side (a lower side in FIG. 1) thereof.

As shown in FIG. 1, the frontlight 10 includes an approximately flat-shaped light guiding plate 12 which has a pair of main surfaces 12b and 12c opposite to each other, a bar-shaped light guide 13 disposed along an end surface 12a of the light guiding plate 12, and an LED 13a, serving as a light emitting element, disposed near an end surface of the light guide 13. That is, in the frontlight 10 according to the embodiment, the LED 13a and the bar-shaped light guide 13 constitute a light source and the end surface 12a of the light guiding plate 12 constitutes a light-incident surface.

As shown in FIG. 2, the light guiding plate 12 of the frontlight 10 is disposed on a display area of the liquid crystal display panel 20, and light emitted from the LED 13a is directed to the liquid crystal display panel 20 from a light-radiation surface 12b. The light guiding plate 12 is made of a transparent resin material, for example, acrylic resin, ring-shaped polyolefin resin, polycarbonate resin, or the like.

A main surface of the light guiding plate 12 facing the liquid crystal display panel 20 (main surface at a lower side of the light guiding plate 12 in FIG. 2) is formed with a plurality of prisms 14, as shown in FIG. 2. Each of the prisms 14 has a first surface 14a (gentle-sloped surface) which is relatively close to the end surface 12a and has a relatively gentle slope, a second surface 14b (steep-sloped surface) which is relatively distant from the end surface 12a and has a relatively steep slope, and a third surface 14c (flat surface) located between the first surface and the second surface, and the angle between the second surface and the third surface is an acute angle. Therefore, the plurality of prisms is disposed in a stripe shape to be parallel to one another, as shown in FIG. 1, and the cross section thereof has an approximately saw-tooth shape.

The liquid crystal display panel 20 includes an upper substrate 21 and a lower substrate 22 disposed opposite to each other, and a liquid crystal layer 23 is interposed between the upper substrate 21 and the lower substrate 22. The liquid crystal layer 23 is sealed with a sealing material 24 provided along the periphery of the inner surfaces of the upper substrate 21 and the lower substrate 22. A liquid crystal control layer 26 is provided on a main surface of the upper substrate 21 facing the lower substrate 22, and a reflective layer 27 for reflecting the light emitted from the frontlight 10 and external light is provided on a main surface of the lower substrate 22 facing the upper substrate 21. A liquid crystal control layer 28 is provided on the reflective layer 27.

The liquid crystal control layers 26 and 28 each include an alignment film and electrodes for driving and controlling the liquid crystal layer 23, semiconductor elements for switching the electrodes, and the like. In addition, if necessary, a color filter for color display may be included therein. Further, it is preferable that the reflective layer 27 have a light scattering means in order to prevent the visibility of the liquid crystal display device from deteriorating due to reflected light intensified in a specific direction. As the light scattering means, a scattering film in which a thin reflection film is provided with irregularities, a scattering film in which beads are dispersed in a resin matrix, or the like, the beads being made of a resin material having a refractive index different from that of a material for the resin matrix, may be used.

In the present embodiment, the liquid crystal display panel 20 is a reflective liquid crystal display panel. In FIG. 1, a rectangular shaped area 20D shown by a dotted line in the liquid crystal display panel 20 is a display area. In the display area 20D, a plurality of pixels are formed in a matrix. The light guiding plate 12 of the frontlight 10 is disposed on the display area 20D. At this time, the frontlight 10 is disposed such that the light-radiation surface 12b of the light guiding plate 12 faces the liquid crystal display panel 20.

Figure 3:
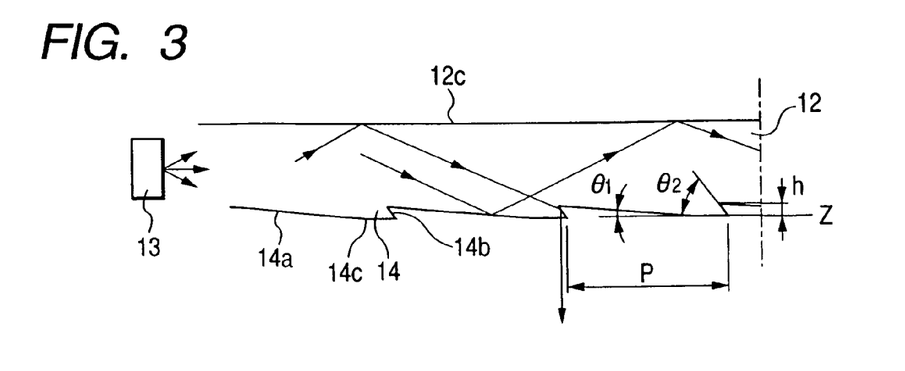
FIG. 3 is a partially cross-sectional view explaining a light guiding state of the frontlight shown in FIG. 2.

FIG. 3 is a partially cross-sectional view explaining a light guiding state of the frontlight shown in FIG. 2. As shown in FIG. 3, the prism 14 formed on the light-radiation surface 12b has a pair of sloped surfaces inclined with respect to a horizontal reference plane z of the light-radiation surface 12b as described above, that is, the prism 14 has a gentle-sloped surface 14a which is relatively close to the end surface 12a, a steep-sloped surface 14b which is relatively distant from the end surface 12a, and a flat surface 14c located between the gentle-sloped surface 14a and the steep-sloped surface 14b, and the angle (slope angle) $\theta_2$ between the steep-sloped surface 14b and the flat surface 14c is an acute angle. In addition, the gentle-sloped surface 14a is formed to have an angle $\theta_1$ with respect to the horizontal reference plane z of the light-radiation surface 12b.

In the invention, preferably, the angle $\theta_2$ is formed such that light incident from the end surface 12a is reflected from the steep-sloped surface 14b and then the reflected light is directed to the outside from the flat surface 14c. For example, the slope angle $\theta_2$ of the steep-sloped surface 14b is preferably in a range of 40° to 60°. Further, preferably, the pitch P (distance between apices X of the prisms 14 or distance between apices Y of the prisms 14) between the prisms 14 is constant within the light-radiation surface 12b of the light guiding plate 12, and the height h (distance between the horizontal reference plane z and the apex Y of the prism 14) of the prism 14 varies gradually within the light-radiation surface 12b such that it becomes larger as the prism 14 is farther from the light source. Furthermore, it is not necessary that the pitch P between the prisms 14 be constant within the light-radiation surface 12b, but it may be appropriately changed. In addition, it is not necessary that the height h of the prism 14 vary within the light-radiation surface 12b, but it may be constant within the light-radiation surface 12b. Moreover, the slope angles $\theta_1$ and $\theta_2$ of the prism 14 may be appropriately changed in the light-radiation surface 12b.

Figure 4:
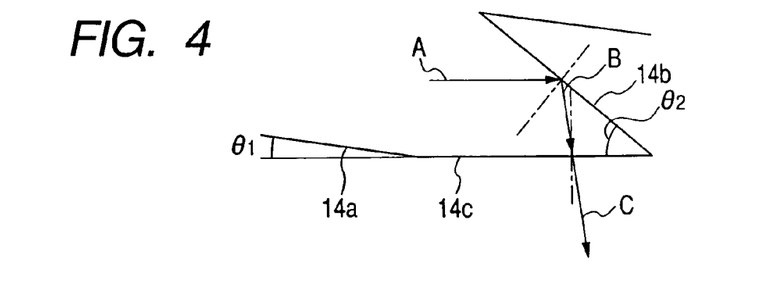
FIG. 4 is an enlarged view illustrating the configuration of a prism of a light guiding plate according to an embodiment of the invention.

Next, the flat surface 14c located between the gentle-sloped surface 14a and the steep-sloped surface 14b will be described with reference to FIG. 4. FIG. 4 is an enlarged view illustrating the configuration of a prism of a light guiding plate according to an embodiment of the invention.

In the light guiding plate 12 according to the invention, the angle $\theta_2$ between the steep-sloped surface 14b and the flat surface 14c is an acute angle. When the light guiding plate 12 having the prisms 14, each having the acute angle, is manufactured by an injection molding method, there is a possibility of a molding failure since a transparent resin material is not sufficiently filled up to the apices of prisms in a mold. Therefore, in the light guiding plate 12 according to the invention, the length of a base portion of the prism 14 is set to be large so that the resin can be filled up to the apices of prisms in a mold. That is, in the light guiding plate 12, the prism 14 is not constituted by only the gentle-sloped surface 14a and the steep-sloped surface 14b, but the flat surface 14c is provided between the gentle-sloped surface 14a and the steep-sloped surface 14b, and the angle $\theta_2$ between the steep-sloped surface 14b and the flat surface 14c is formed to be large.

As such, since the angle $\theta_2$ between the steep-sloped surface 14b and the flat surface 14c is formed to be large, a resin can be easily filled into the mold during an injection molding process. Thereby, a resin is filled up to the apices of prisms in a mold, which makes it possible to obtain the light guiding plate 12 having an intended shape (shape in which the angle $\theta_2$ between the steep-sloped surface 14b and the flat surface 14c is an acute angle). Here, it is preferable that the angle $\theta_2$ be determined on the basis of the characteristics of a transparent resin material constituting the light guiding plate 12. The characteristics of the transparent resin material are melt flow rate, viscosity, flow stop temperature, or the like. Therefore, the angle $\theta_2$ is an angle set such that the light incident from the end surface 12a of the light guiding plate 12 is reflected from the steep-sloped surface 14b and then the reflected light is directed to the outside from the flat surface 14c, and the angle $\theta_2$ is preferably determined on the basis of the characteristics of a transparent resin material constituting the light guiding plate 12. Further, it is preferable that the length of the flat surface 14c be determined on the basis of the angle $\theta_2$. Furthermore, in the invention, the flat surface may have any shape to make it easy to fill a resin into a mold during an injection molding process. That is, it may be not only a completely flat surface but also a completely or partially curved surface, for example.

Figure 5:
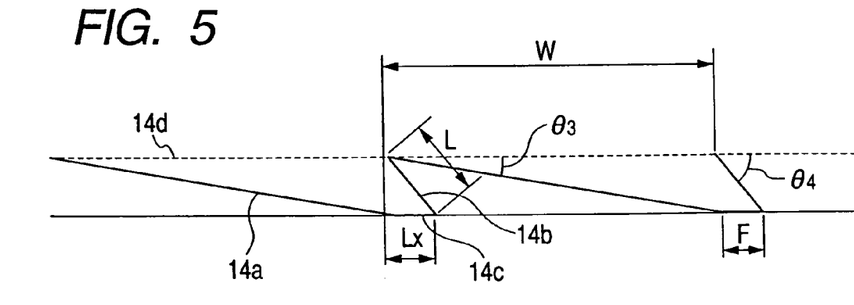
FIG. 5 is a view explaining the length of a flat surface in the prism of the light guiding plate according to the embodiment of the invention.

FIG. 5 is a view explaining the length of the flat surface in the prism of the light guiding plate according to the invention. In FIG. 5, the length of the flat surface 14c which is the third surface is denoted by F, and the length when the steep-sloped surface 14b which is the second surface is projected onto the flat surface 14c is denoted by Lx (cosine of the length L of the steep-sloped surface 14b: Lx=L·cos $\theta_4$). In addition, the angle between the gentle-sloped surface 14a and the reference plane 14d in the base portion of the prism 14 is set to $\theta_3$, and the angle between the reference plane 14d and the steep-sloped surface 14b is $\theta_4$.

In the prism 14, the illumination contrast can be enhanced due to the flat surface 14c. Here, the illumination contrast is defined by the amount (lower-side luminance ($cd/m^2$)) of light directed downward by the prisms 14, among light emitted from the light source, and the amount (upper-side luminance ($cd/m^2$)) of light leaking upward due to the prisms 14, among the light emitted from the light source, as following equation.

Illumination contrast={0.10×(lower-side luminance)+(upper-side luminance)}/(upper-side luminance)

The inventors have noted that, if there is no flat surface 14c in the prism 14 having a saw-tooth shape as its cross section, the light (light reflected from the steep-sloped surface 14b) denoted by an arrow B shown in FIG. 4 is apt to be reflected from a gentle-sloped surface to leak upward, and have found out that the light reflected from a gentle-sloped surface to leak upward could be directed downward by providing the flat surface 14c. Therefore, by providing the flat surface 14c to the prism 14 having an approximately saw-tooth shape as its cross section, light denoted by an arrow B shown in FIG. 4 can be efficiently directed downward, which makes it possible to reduce the upper-side luminance and to enhance the lower-side luminance. As a result, the illumination contrast can be improved. Thereby, the contrast of a display device to be illuminated can be improved. If the contrast of the display device is improved, it is possible to obtain further clear images.

Figure 7A:
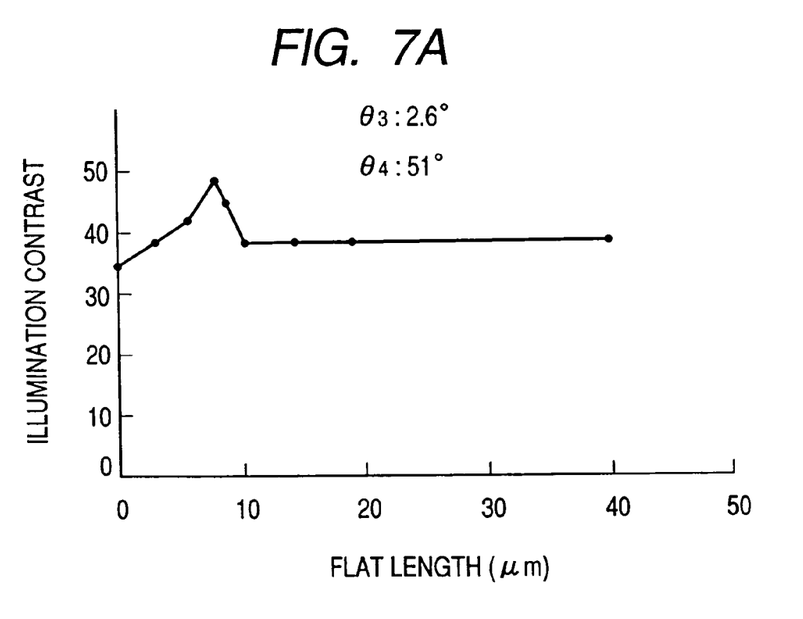
FIG. 7A is a characteristic view illustrating the relationship between the length of the flat surface and the illumination contrast.
Figure 7B:
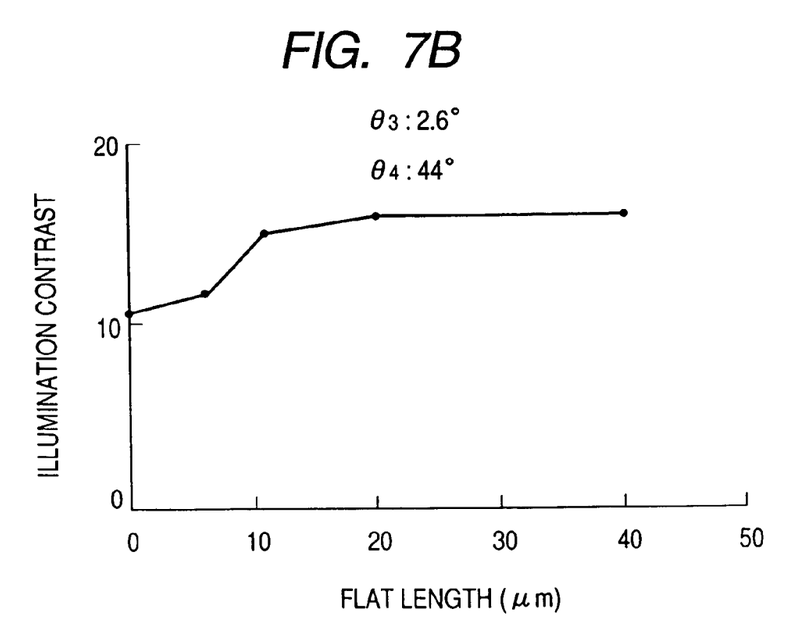
FIG. 7B is a characteristic view illustrating the relationship between the length of the flat surface and the illumination contrast.

Here, the relationship between the length of the flat surface 14c and the illumination contrast in the prism 14 having an approximately saw-tooth shape as its cross section was examined. That is, in the prism 14 having an approximately saw-tooth shape as its cross section, the illumination contrast was examined by varying the length F of the flat surface 14c from 0 µm to 40 µm with the angles $\theta_3$ and $\theta_4$ set to 2.6° and 51°, respectively, and the width (W in FIG. 5) of the prism 14 set to 256 µm, and the result is shown in FIG. 7A. Further, in the prism 14 having an approximately saw-tooth shape as its cross section, the illumination contrast was examined by varying the length F of the flat surface 14c from 0 µm to 40 µm with the angles $\theta_3$ and $\theta_4$ set to 2.6° and 44°, respectively, and the width (W in FIG. 5) of the prism 14 set to 256 µm, and the result is shown in FIG. 7B. In addition, the illumination contrast was calculated by the above-described equation after measuring the amount (lower-side luminance) of light directed downward among light emitted from the light source and the amount (upper-side luminance) of light leaking upward among the light emitted from the light source. The lower-side luminance and the upper-side luminance were measured by using a white LED (manufactured by Nichia Corporation) as a light source and a spectroradiometer SR-3 (manufactured by Topcon Corporation, product name).

As can be seen in FIGS. 7A and 7B, in the prism 14 having an approximately saw-tooth shape as its cross section, the illumination contrast in a case in which there is no flat surface 14c is higher than the illumination contrast in a case in which there is a flat surface 14c. It is considered that this is because the upper-side luminance is reduced and the lower-side luminance is enhanced by efficiently directing the light denoted by the arrow B shown in FIG. 4 downward, as described above.

Figure 6A:
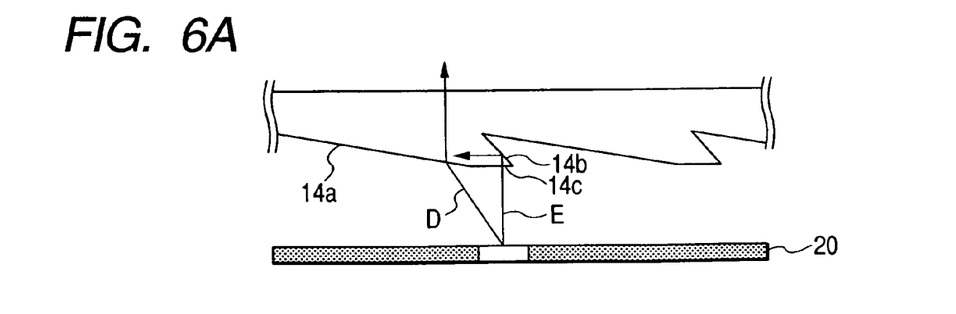
FIG. 6A is a view explaining a light path of light reflected from a liquid crystal display panel.
Figure 6B:
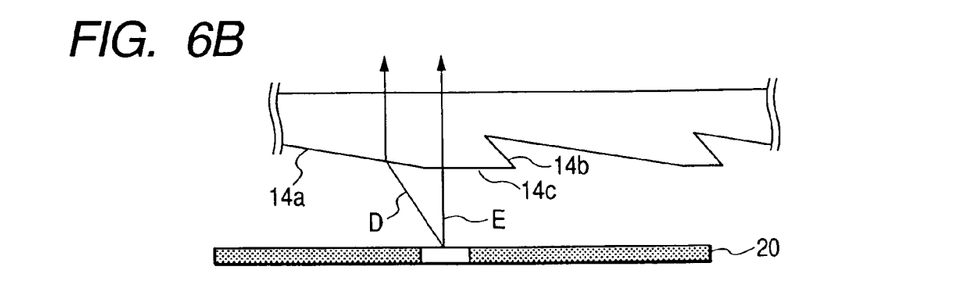
FIG. 6B is a view explaining a light path of light reflected from the liquid crystal display panel.

In the configuration, when the display quality and the illumination contrast are considered, the length F of the flat surface 14c is preferably equal to or smaller than the length Lx when the steep-sloped surface 14b is projected onto the flat surface 14c. As shown in FIG. 6A, when the length F of the flat surface 14c is equal to or smaller than the length Lx, the direction of a light path E, of two light paths D and E reflected from the liquid crystal display panel 20, can be changed by the steep-sloped surface 14b, so that a light path toward a viewer becomes a single light path D. On the other hand, as shown in FIG. 6B, when the length F of the flat surface 14c exceeds the length Lx, there is a case in which the two light paths D and E reflected from the liquid crystal display panel 20 are toward a viewer. Therefore, by setting the length F of the flat surface 14c equal to or smaller than the length Lx, it is possible to improve the illumination contrast under a state in which the image quality is further improved.

Figure 8A:
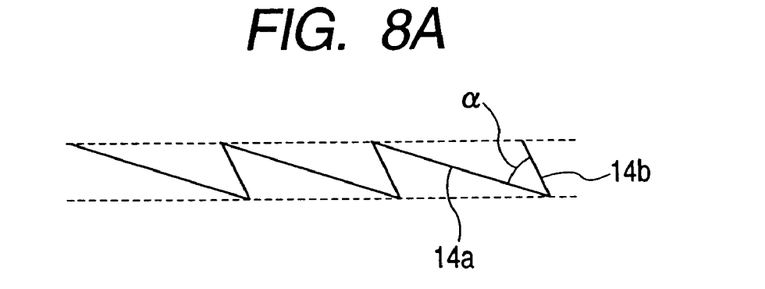
FIG. 8A is a view illustrating an example of the prism shape in the light guiding plate.
Figure 8B:
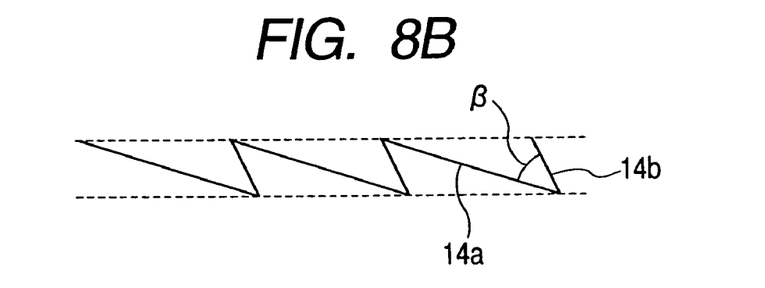
FIG. 8B is a view illustrating an example of the prism shape in the light guiding plate.
Figure 8C:
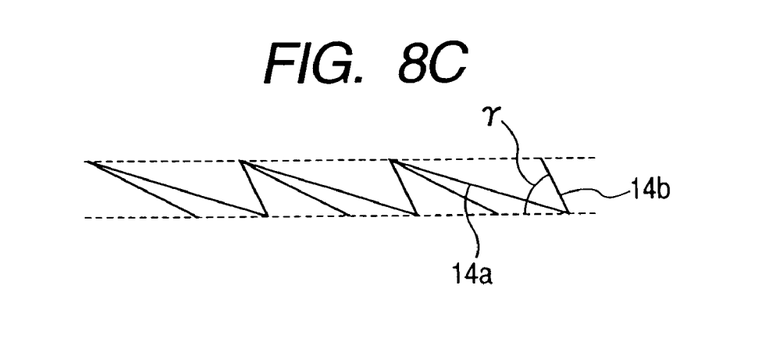
FIG. 8C is a view illustrating an example of the prism shape in the light guiding plate.

Here, experimental examples with respect to a prism shape in a light guiding plate will be described. FIGS. 8A to 8C are views illustrating examples of the prism shapes in the light guiding plate, and FIG. 9 is a characteristic view illustrating effects due to the prism shapes shown in FIGS. 8A to 8C.

First, a light guiding plate (first experimental example) having a prism shape in which the angle $\theta_2$ is $\alpha$ as shown in FIG. 8A, a light guiding plate (second experimental example) having a prism shape in which the angle $\theta_2$ is $\beta$ ($\beta<\alpha$) as shown in FIG. 8B, and a light guiding plate (example of the invention) having a prism shape (having the flat surface 14c) in which the angle $\theta_2$ is $\gamma$ ($\beta<\gamma<\alpha$) as shown in FIG. 8C were manufactured.

With respect to each of the light guiding plates of the first and second experimental examples and of the example of the invention, the LED 13a and the bar-shaped light guide 13 are provided as shown in FIG. 2, but a light receiver is disposed instead of the liquid crystal display panel 20 shown in FIG. 2, and thus the luminance of light, which is emitted from the LED 13a to propagate through the light guiding plate 12 and then exits from the light-radiation surface 12b, was measured. Specifically, the luminance of light ranging from −30° to +30° with respect to a normal line of the light-radiation surface 12b of the light guiding plate 12 was measured by using an SV chip white LED having a height of 1.1 mm as an LED and SR-3 (manufactured by Topcon Corporation, product name) as a receiver. The result is shown in FIG. 9.

Figure 9:
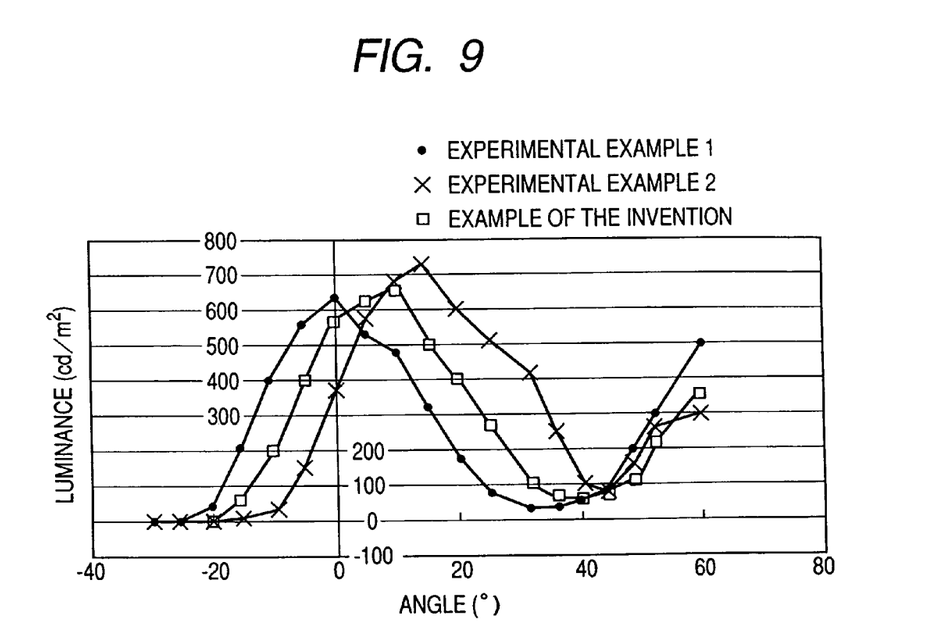
FIG. 9 is a characteristic view illustrating effects due to the prism shapes shown in FIGS. 8A to 8C.

As can be seen in FIG. 9, in a case in which the light guiding plate of the example of the invention was used, a high peak value was obtained, in the same manner as in cases in which the light guiding plates of the first and second experimental examples were used. Therefore, even when the light guiding plate of the example of the invention is used, light can be efficiently directed to a viewer without any trouble.

Further, injection moldability when the injection molding process with respect to each of the light guiding plates of the first and second experimental examples and of the example of the invention was performed by using an acrylic resin as a resin material was examined. As the injection moldability, it was examined whether a resin was filled up to the apices of prisms of the respective light guiding plates to be molded. As a result, the injection moldability was good in the order of the light guiding plate of the example of the invention, the light guiding plate of the first experimental example, and the light guiding plate of the second experimental example. Therefore, when the optical characteristics shown in FIG. 9 and the injection moldability are considered, it can be seen that the prism shape of the example of the invention is preferable.

In the liquid crystal display device having the configuration described above, a viewer can see images displayed on the liquid crystal display panel 20 through the light guiding plate 12. In addition, in a dark place where external light can not be obtained, the LED 13a of the frontlight 10 is lighted. The light emitted from the LED 13a passes through the bar-shaped light guide 13, then is introduced to the inside of the light guiding plate 12 from the end surface 12a of the light guiding plate 12, then propagates through the inside of the light guiding plate 12, and then is directed to the liquid crystal display panel 20 from the light-radiation surface 12b (lower surface in the figure). By illuminating the liquid crystal display panel 20 in such a manner, a viewer can see the images displayed on the liquid crystal display panel 20 through the light guiding plate 12 even in a dark place.

Specifically, when the LED 13a of the frontlight 10 is lighted, as shown in FIG. 4, the light (denoted by an arrow A) having propagated through the inside of the light guiding plate 12 is reflected from the steep-sloped surface 14b, and then the reflected light is directed to the flat surface 14c. The light denoted by the arrow A is incident on the steep-sloped surface 14b at an angle exceeding 45° with respect to a normal line (one-dotted line) (precisely speaking, at an angle larger than a threshold angle obtained from the refractive index). Thus, it is possible to prevent the light (denoted by an arrow A) incident on the steep-sloped surface 14b from being transmitted through the steep-sloped surface 14b as much as possible. As a result, the amount of light reflected from the steep-sloped surface 14b increases, which enhance the luminance of the frontlight 10. Since the light reflected from the steep-sloped surface 14b reaches the flat surface 14c at an approximately right angle with respect to the flat surface 14c, it is refracted from the flat surface 14c to be directed to the outside (toward the liquid crystal display panel 20). In addition, the inventors verified that the amount of illuminated light of the frontlight 10 could be increased by optimizing the slope angle of the steep-sloped surface 14b as described above in Japanese Patent Application No. 2004-150286, which is incorporated herein by reference.

As such, the frontlight 10 of the present embodiment is capable of efficiently directing light toward the liquid crystal display panel 20, which makes it possible to efficiently direct the light to a viewer. In particular, in the light guiding plate 12 of the frontlight 10 of the embodiment, the light-radiation surface 12b having the prisms 14 is opposite to the liquid crystal display panel 20, and the light exiting from the light-radiation surface 12b is directly provided to the liquid crystal display panel 20 as described above, so that the light can be provided to the liquid crystal display panel 20 from the light guiding plate 12 without any loss of light. Also, since the light-radiation surface 12b having the prisms 14 faces the liquid crystal display panel 20, the main surface 12c of the light guiding plate 12 opposite to the light-radiation surface 12b having the prisms 14 is a flat surface. For this reason, a cover for protecting the prisms 14 of the light guiding plate 12 shown in FIG. 10 is not required, and accordingly, optical elements can be easily disposed on the main surface 12c of the light guiding plate 12 as occasion demands.

Further, the light guiding plate of the present embodiment has the gentle-sloped surface 14a relatively close to the end surface 12a, the steep-sloped surface 14b relatively distant from the end surface 12a, and the flat surface 14c located between the gentle-sloped surface 14a and the steep-sloped surface 14b, and the angle (slope angle) $\theta_2$ between the steep-sloped surface 14b and the flat surface 14c is an acute angle. For this reason, it is possible to make the angle $\theta_2$ between the steep-sloped surface 14b and the flat surface 14c relatively large, which makes it easy to fill a resin into a mold during an injection molding process. As a result, a resin is filled up to the apices of prisms in a mold, and thus the light guiding plate 12 having an intended shape can be obtained.

According to the invention, the light guiding plate includes a pair of main surfaces opposite to each other and an end surface on which light emitted from a light source is incident, one of the pair of main surfaces has a plurality of prisms, each of the prisms having a first surface which is relatively close to the end surface and has a relatively gentle slope, a second surface which is relatively distant from the end surface and has a relatively steep slope, and a third surface located between the first surface and the second surface, and the angle between the second surface and the third surface is an acute angle, so that the light can be efficiently directed to a viewer.

Having described the embodiment of the invention, it is to be understood that the invention is not limited thereto, but various changes and modifications thereof can be made. For example, in the embodiment described above, an optical component such as a light guiding plate is not limited to a plate shaped body, but a film shaped body which is thinner than the plate shaped body; or a sheet shaped body which is wider than the plate shaped body; may be used. In addition, in the embodiment described above, the case in which the light source is composed of an LED, which is a light emitting element, and a bar-shaped light guide has been described; however, in the invention, the light source may be composed of other components other than the LED and the bar-shaped light guide. Further, in the embodiment described above, the case in which the liquid crystal display device is a reflective liquid crystal display device has been described; however, the invention can be applied to a transflective liquid crystal display device in the same manner. Furthermore, the invention can be applied to an electronic paper apparatus in which an electronic paper device is disposed to face a main surface having prisms of a light guiding plate of a surface-emitting device. Also, the invention can be appropriately changed and modified without departing from the spirit or scope of the invention.

The invention claimed is:

1. A light guiding plate comprising:
a pair of main surfaces opposite to each other; and
an end surface on which light emitted from a light source is incident,
wherein one of the pair of main surfaces has a plurality of prisms, and the light from the light source incident from the end surface propagates through the inside of the light guiding plate and exits from the prism, each of the prisms having a first surface which is disposed near the end surface and has a relatively gentle slope, a second surface which is disposed more distant from the end surface than the first surface and has a relatively steep slope, and a third surface located between the first surface and the second surface,
wherein an angle between the second surface and the third surface is an acute angle,
wherein the first surface is configured to reflect light from the end surface such that the light is propagated between the pair of main surfaces, and wherein the second surface is configured to reflect light from the end surface to the third surface such that the light is transmitted through the third surface, thereby passing outside the light guiding plate,
wherein the third surface is substantially parallel to a horizontal reference plane and wherein an angle between the first surface and the horizontal reference plane is an acute angle $\theta 1$ in a light propagating direction and an angle between the second surface and the horizontal reference plane is an acute angle $\theta 2$ in the light propagating direction where $\theta 2 > \theta 1$,
wherein the angle between the second surface and the third surface is set such that light incident from the end surface is reflected from the second surface and then the reflected light exits outside from the third surface, and
wherein a length of the third surface is equal to or smaller than a length when the second surface is projected onto the third surface.

2. The light guiding plate according to claim 1, wherein the light guiding plate is made of a transparent resin material.

3. The light guiding plate according to claim 2, wherein the angle between the second surface and the third surface is determined on the basis of characteristics of the transparent resin material.

4. The light guiding plate according to claim 3, wherein the characteristics are at least one selected from a group composed of a melt flow rate, a viscosity, and a flow stop temperature.

5. A surface emitting device comprising:
the light guiding plate according to claim 1; and
a light source disposed near the end surface of the light guiding plate.

6. A liquid crystal display device comprising:
the surface emitting device according to claim 5; and
a liquid crystal display panel disposed to face the one main surface having the plurality of prisms of the light guiding plate.

7. An electronic paper apparatus comprising:
the surface emitting device according to claim 5; and
an electronic paper device disposed to face the one main surface having the plurality of prisms of the light guiding plate.

* * * * *